United States Patent
Wang et al.

(10) Patent No.: US 9,965,717 B2
(45) Date of Patent: May 8, 2018

(54) LEARNING IMAGE REPRESENTATION BY DISTILLING FROM MULTI-TASK NETWORKS

(71) Applicant: ADOBE SYSTEMS INCORPORATED, San Jose, CA (US)

(72) Inventors: Zhaowen Wang, San Jose, CA (US); Xianming Liu, Champaign, IL (US); Hailin Jin, San Jose, CA (US); Chen Fang, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 43 days.

(21) Appl. No.: 14/940,916

(22) Filed: Nov. 13, 2015

(65) Prior Publication Data
US 2017/0140248 A1    May 18, 2017

(51) Int. Cl.
| | |
|---|---|
| G06K 9/00 | (2006.01) |
| G06N 3/04 | (2006.01) |
| G06K 9/62 | (2006.01) |
| G06K 9/46 | (2006.01) |
| G06N 3/08 | (2006.01) |
| G06Q 50/00 | (2012.01) |

(52) U.S. Cl.
CPC ......... *G06N 3/0454* (2013.01); *G06K 9/4628* (2013.01); *G06K 9/627* (2013.01); *G06K 9/629* (2013.01); *G06K 9/628* (2013.01); *G06K 9/6257* (2013.01); *G06K 9/6284* (2013.01); *G06N 3/04* (2013.01); *G06N 3/08* (2013.01); *G06Q 50/01* (2013.01)

(58) Field of Classification Search
CPC ............ G06N 3/454; G03N 3/04; G03N 3/08; G06K 9/4628; G06K 9/629; G06K 9/6257; G06K 9/627; G06K 9/628; G06K 9/6284; G06Q 50/01

USPC .......................................................... 382/157
See application file for complete search history.

(56) References Cited

U.S. PATENT DOCUMENTS

| | | | |
|---|---|---|---|
| 8,396,867 B2 * | 3/2013 | Mehta | G06F 17/30554 707/723 |
| 8,738,354 B2 * | 5/2014 | Platt | G06F 17/28 704/2 |
| 8,971,645 B1 * | 3/2015 | Ning | G06K 9/00718 382/103 |

OTHER PUBLICATIONS

Hinton, G., Vinyals, O., & Dean, J. (2015). Distilling the knowledge in a neural network. arXiv preprint arXiv:1503.02531.

* cited by examiner

*Primary Examiner* — Iman K Kholdebarin
(74) *Attorney, Agent, or Firm* — Shook, Hardy & Bacon L.L.P.

(57) ABSTRACT

Embodiments of the present invention relate to learning image representation by distilling from multi-task networks. In implementation, more than one single-task network is trained with heterogeneous labels. In some embodiments, each of the single-task networks is transformed into a Siamese structure with three branches of sub-networks so that a common triplet ranking loss can be applied to each branch. A distilling network is trained that approximates the single-task networks on a common ranking task. In some embodiments, the distilling network is a Siamese network whose ranking function is optimized to approximate an ensemble ranking of each of the single-task networks. The distilling network can be utilized to predict tags to associate with a test image or identify similar images to the test image.

20 Claims, 4 Drawing Sheets

LEARNING IMAGE REPRESENTATION BY DISTILLING FROM MULTI-TASK NETWORKS

BACKGROUND

The goal of feature learning is to represent an image numerically with a vector of floating numbers, so that visually and semantically similar images are close in the numerical feature space. Feature representation is the cornerstone for many functions on social media, such as image search, auto-tagging, recognition, detection, recommendation, etc. Traditional feature learning is based on meticulously labeled classification datasets such as ImageNet. However, learning with images from social media requires the handling of noisy and multi-facet labels from users. For example, on Behance, images are organized in projects owned by users, and the projects are further assigned to different fields and featured sites according to their styles and purposes. All the information about image-project association, ownership, field, and site categories can be regarded as labels for training, and they characterize images from different facets. However, these labels have very different structures and are often heavily corrupted by noise (for example, non-comparable taxonomies or syntax). This makes it difficult to apply the conventional classification-based feature learning. Using features trained on classification datasets is also unsatisfactory due to domain shift.

SUMMARY

Embodiments of the present invention relate to learning image representation by distilling from multi-task networks. More than one single-task network are trained with heterogeneous labels. In some embodiments, each of the single-task networks is transformed into a Siamese structure with three branches of sub-networks so that a common triplet ranking loss can be applied to each branch. A distilling network is trained that approximates the single-task networks on a common ranking task. In some embodiments, the distilling network is a Siamese network whose ranking function is optimized to approximate an ensemble ranking of each of the single-task networks. The distilling network can be utilized to predict tags to associate with a test image or identify similar images to the test image.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
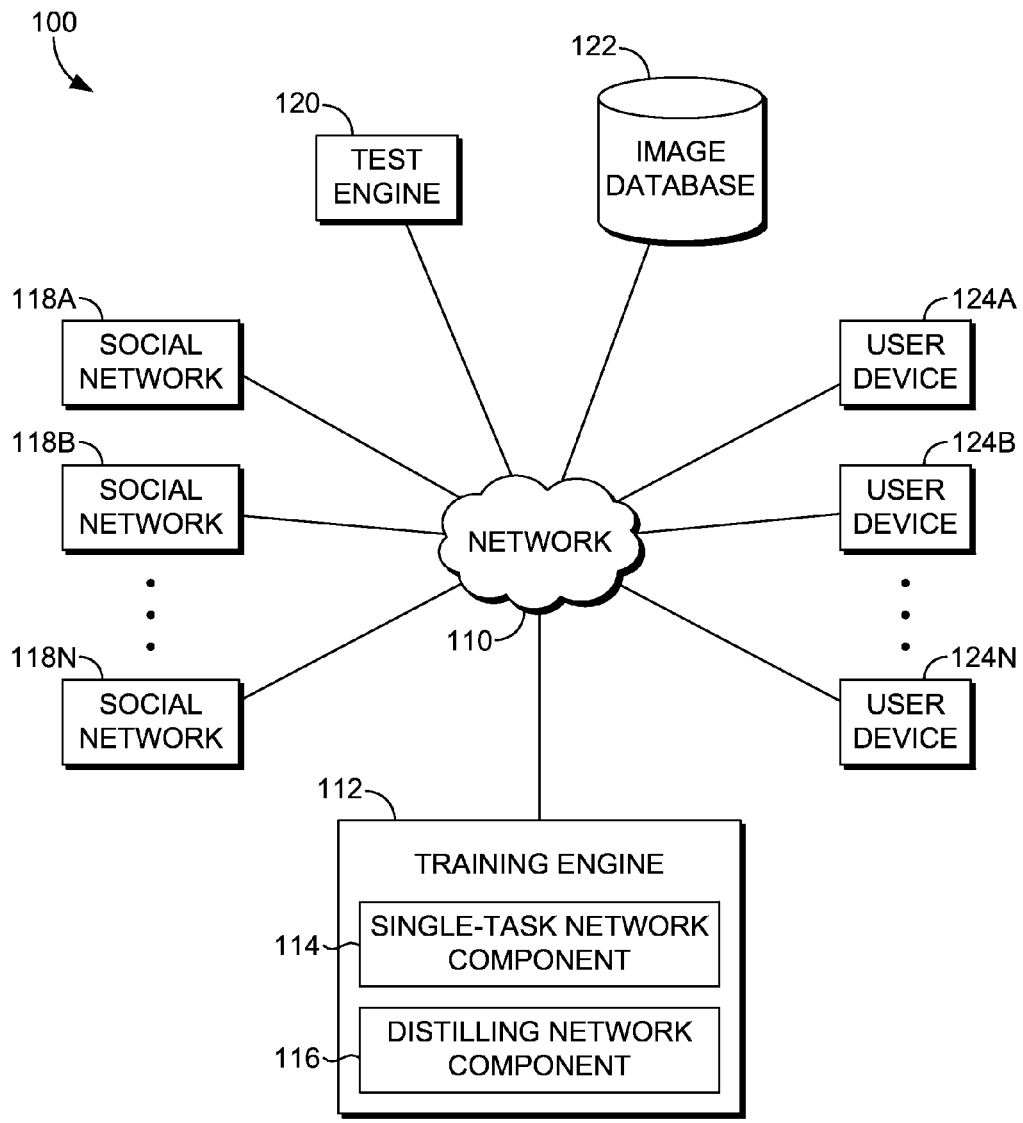
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed previously, learning with images from social media requires the handling of noisy and multi-facet labels from users. All the information about image-project association, ownership, field, and site categories can be regarded as labels for training, and they characterize images from different facets. However, these labels have very different structures and are often heavily corrupted by noise. This makes it difficult to apply the conventional classification-based feature learning. Using features trained on classification datasets is also unsatisfactory due to domain shift.

Embodiments of the present invention generally relate to learning image representation by distilling from multi-task networks. In this way, embodiments of the present invention address the problem of learning visual features for images on social media with heterogeneous label information. Instead of learning a single classification model, deep neural networks with different architectures for different tasks (e.g., labels) are learned. A distilling network can then be trained to act as the ensemble of all the single-task networks. Distilling from multiple networks trained with different labels enables the learning to overcome user labelling noise that is problematic for conventional feature learning on social networks. The response from the distilling network can be used as a compact and robust image feature which allows for faster computation that can be scalable to millions of images on social networks.

Initially, a neural network is built which takes in an image and outputs its feature vector. There are two steps in building such a neural network. First, multiple single-task networks are trained with heterogeneous labels on a social network. Second, a distilling network is trained that approximates the ensemble of all the single-task networks on a common ranking task. This distilling network is the final network that provides the classification. All the networks are trained on the same set of images but with different labels.

Although each of the single-task networks can be trained with any supervised or unsupervised objective, in a preferred implementation, three tasks commonly available on social media are utilized. The first network is trained for object class category. A traditional convolutional neural network (CNN) may be trained with a softmax cost function. A CNN is a deep network that is trained with an objective of classifying a large number of objects. Once the CNN is trained, the network response at an intermediate layer is utilized as the image feature. The feature is translation and illumination invariant and sensitive to the object category presented in images.

The second network is trained for pairwise similarity on image style. The label information can be obtained from field/feature sites from a social network (e.g., Behance.net) or a general image search engine with a keyword or filter. In this network, two images with the same style are close in feature space and apart otherwise. A Siamese network structure may be utilized for the second network. Siamese networks are networks trained with an object to rank a set of images in the correct order. Each of the images in the set is fed into the same sub-network, and their feature responses are compared so that a proper relation among them can be determined. Popular relations include: relative attribute (image A is more XXX than image B), pairwise similarity (image A and image B are similar/dissimilar), and triplet similarity (image B is more similar to A than image C). Siamese networks can handle image labels that are more general than class categories. However, a single Siamese network can only model one kind of relation among images and may not be robust to noise.

The third network is trained for triplet similarity on image group. Image group information is widely available from project, album, post, etc. Group membership can be used to define relevance between images. Typically, two images belonging to the same group are relevant or similar to each other, and vice versa. With such group information, a triplet can be formed of a reference image, a positive image, and a negative image. A positive image (i.e., an image that comes from the same group as a reference image) and a negative image (i.e., an image that comes from a different group as the reference image) are utilized to determine the similarity order among the three images. As with the second network, the third network utilizes a Siamese network structure.

Because each of the single-task networks have different training objective functions and feature dimensions, they cannot be fused into one network using conventional distilling methods. Instead, each of the single-task networks is transformed into a Siamese structure with three branches of sub-network so that a common triplet ranking loss can be applied to all of them. In distilling, a new Siamese network whose ranking function is optimized to approximate the ensemble ranking of all the single-task networks is trained. Triplet sampling can be carried out similarly as in the single-task network and all the label information (i.e., object category, style field, image group) can be utilized to sample positive and negative images.

Thus, embodiments of the present invention enable a model that is trained with multiple heterogeneous labels including classification, ranking, group association, ownership, user view/click, or textual tags. Unlike traditional distilling that requires all single networks to be trained for the same set of object classes, the present invention allows for multi-task training, where each single network is trained with a different architecture and objective (including both softmax and ranking losses), which enables the present invention to overcome user labelling noise that is problematic for conventional feature learning on social networks.

CNN is typically trained with classification labels, but embodiments of the present invention can be trained with multiple heterogeneous labels including classification, ranking, group association, ownership, user view/click and textual tags. Also, CNN trained on object category is inefficient for describing image styles, which is important for design and art works on Behance.net.

Siamese networks are designed for a single task. However, embodiments of the present invention utilizes multiple Siamese networks trained for different tasks and then combined into a distilling network which produces a robust and general feature applicable to any task.

Like CNN, knowledge distilling only considers classification labels. All the single networks must be trained for the same set of object classes. Embodiments of the present invention extend traditional distilling to multi-task training, where each single network is trained with different architectures and objectives (including both softmax and ranking losses).

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as environment 100. The environment 100 of FIG. 1 includes a user device(s) 124A-124N, training engine 112, social network(s) 118A-118N, test engine 120, and image database 122. Each of the user device(s) 124A-124N, training engine 112, social network(s) 118A-118N, test engine 120, and image database 122 may be, or include, any type of computing device (or portion thereof), such as computing device 600 described with reference to FIG. 6, for example. The components may communicate with each other via a network 110, which may include, without limitation, one or more local area networks (LANs) and/or wide area networks (WANs). Such networking environments are commonplace in offices, enterprise-wide computer networks, intranets, and the Internet.

It should be understood that any number of user devices, training engines, social networks, test engines, and/or databases may be employed within the environment 100 within the scope of the present invention. Each may comprise a single device or multiple devices cooperating in a distributed environment. For instance, the training engine 112 and/or test engine 120 may be provided via multiple devices arranged in a distributed environment that collectively provide the functionality described herein. Similarly, all or portions of the functionality provided by the test engine 120 may be provided by other components, such as the training engine 112, and vice versa. Additionally, other components not shown may also be included within the environment 100, while components shown in FIG. 1 may be omitted in some embodiments.

The user device(s) 124A-124N may be any type of computing device owned and/or operated by a user that can access network 110. For instance, the user device(s) 124A-124N may be a desktop computer, a laptop computer, a tablet computer, a mobile device, a wearable device or any other device having network access. Generally, a user may employ the user device(s) 124A-124N to, among other things, communicate and/or view images on social network(s) 118A-118N. For example, the user may employ a web browser or application on the user device(s) 124A-124N to upload, access, view, and/or provide tags to the images provided by social network(s) 118A-118N. The user may additionally employ the test engine 120 to classify an image or identify an image similar to an image stored on the user device(s) 124A-124N, the social network(s) 118A-118N, or the image database 122.

The image database 122 may be any type of device capable of hosting and serving data to computing devices, such as the social network(s) 118A-118N and/or user device(s) 124A-124N the training engine 112, and/or the test engine 120. By way of example, and not limitation, the image database 122 may be a server maintaining images utilized by the training engine 112 to learn image representation that, in turn, provides various functionality to test engine 120 and/or user device(s) 124A-124N.

The training engine 112 is generally configured to facilitate learning image representation by distilling from multi-task networks. Typically, training engine 112 communicates with the image database 122 to learn about image features of the images stored in image database 122. This enables the training engine 112 to train a distilling network that can be utilized by test engine 120 to classify images for a user via a user device(s) 124A-124N or identify similar images for the user via the user device(s) 124A-124N. In accordance with embodiments described herein, the training engine 112 includes a single-task network component 114 and a distilling network component 116. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules are implemented as stand-alone applications. In other embodiments, one or more of the illustrated components/modules are integrated directly into the operating system of the training engine 112 and/or the test engine 120. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the training engine 112 and/or the test engine 120 might reside on a server, cluster of servers, or a computing device remote from or integrated with one or more of the remaining components.

The training engine 112 and/or test engine 120 may be any type of computing device, or incorporated into a computing device, that can access a network (e.g., network 110). For instance, the training engine 112 and/or test engine 120 may be a desktop computer, a laptop computer, a tablet computer, a mobile device, a server, or any other device, or portion thereof, having network access. Generally, the training engine 112 is employed to, among other things, train a distilling network that can be utilized by the test engine 120 to approximate the single-task networks on a common ranking task. In this way, the test engine 120 can utilize the distilling network to predict tags to associate with a test image or identify similar images to the test image for a user via a user device(s) 124A-124N.

As previously mentioned, in embodiments, training engine 112 includes a single-task network component 114 and a distilling network component 116 to facilitate learning image representation by distilling from multi-task networks. In particular, training engine 112 communicates learns a distilling network that is communicated to the test engine 120. In turn, the test engine 120 utilizes the distilling network to predict tags to associate with a test image and/or identify similar images to test image. The predicted tags and/or the similar images may be provided to a user via the user device(s) 124A-124N. Generally, to initiate learning image representation by distilling from multi-task networks, a set of images in association with one or more social networks 118A-118N which may be stored in an image database 122 are provided to or accessible by the training engine 112.

The single-task network component 114 is generally configured to utilize heterogeneous label information to train multiple networks. The single-task network component 114 can be trained with any supervised or unsupervised objective. In some embodiments, three tasks commonly available on social media are utilized to train three single-task networks. In embodiments, each of the single-task networks is trained on the same set of images.

Single-task network component 114 initially trains a first single-task network on object class category. In embodiments, single-task network component 114 trains the first single-task network as a CNN with a softmax cost function. A softmax cost function is typically utilized to handle multiple classes, which is often present in images on social media.

Additionally, single-task network component 114 trains a second single-task network for pairwise similarity on image style. In some embodiments, image style is available on field and site features from Behance.net or a general image search engine results with key word or filter. Field and site are different categorizations of artwork on Behance.net. The artwork is organized into different categories according to the artistic style. Similarly, a search is executed for images by a search engine, the results retrieved by the same query word may be the same category of content or style. Two images with similar style that are close in feature space and apart otherwise are utilized by the second single-task network. Single-task network component 114 trains the second single-task network with a loss function defined by: $\min\Sigma_{(x_A,x_B)} y\|f(x_A)-f(x_B)\|+(1-y)[-\|f(x_A)-f(x_B)\|+\alpha]_+$, where $(X_A, X_B)$ is an image pair, $y\in\{0,1\}$ is the binary label indicating whether or not the two images have the same style, and $\alpha$ is a parameter controlling the margin between images of different style.

Single-task network component 114 trains a third single-task network for triplet similarity on image group. Image group information is widely available from project, album, post, etc. A positive image $X_P$ comes from the same group as a reference image $X_A$, and a negative image $X_N$ comes from a different group. The training objective can be defined by: $\min\Sigma_{(x_A,x_P,x_N)} [\|f(x_A)-f(x_P)\|-\|f(x_A)-f(x_N)\|+\alpha]_+$.

Each of the pairwise and triplet losses utilizes a Siamese network structure with two or three branches of sub-networks with identical structure and parameter. The same network structure can be utilized for all the sub-networks as well as the CNN classification network (i.e., the first single-task network). In embodiments, the network structures are provided by single-task network component 114 as shown below in Table 1.

TABLE 1

| Network Configurations | Name | Type | Kernel size/Filter Number/Stride | Output size |
|---|---|---|---|---|
| | Input | Input | | 256 × 256 × 3 |
| | conv1 | Convolution | 11 × 11/96/4 | 62 × 62 × 96 |
| | pool1 | Pooling | 3 × 3/2 | 31 × 31 × 96 |
| | conv2 | Convolution | 5 × 5/256/1 | 31 × 31 × 256 |
| | pool2 | Pooling | 3 × 3/2 | 15 × 15 × 256 |
| | conv3 | Convolution | 3 × 3/384/1 | 15 × 15 × 384 |
| | conv4 | Convolution | 3 × 3/384/1 | 15 × 15 × 384 |
| | conv5 | Convolution | 3 × 3/256/1 | 15 × 15 × 256 |
| | pool5 | Pooling | 3 × 3/2 | 7 × 7 × 256 |
| AlexNet | fc6 | Fully connected | | 1024 |
| | fc7 | fully connected | | 1024 |
| | fc8 | fully connected | | 256 |
| Fully ConvNetwork | conv6 | Convolution | 3 × 3/256/1 | 7 × 7 × 256 |
| | pool6 | Pooling | Global Average Pooling | 256 |
| | norm | L2 normalization (only for Siamese) | | 256 |

There are a large number of triplet combinations which can make network training slow in enumerating over them. Single-task network component 114 utilizes two approaches to speed up learning and reduce computation. First, single-task network component 114 groups triplets with the same reference images together in a mini-batch, and shares the computation of the reference image. Second, single-task network component 114 samples negative images with probabilities according to an ontological distance to the reference image. For example, images in the same field as the reference image have a greater chance of being selected as negative images. When the resampling probability is properly designed, the effective objective is not biased. Training speed can be significantly improved as triplets with zero or low costs are less likely to be sampled. Each training example is formed as triplet of images. For some training examples, the model in the middle of the training process can already correctly infer the triplet relationship. In such cast, feeding the examples into training will not add new knowledge, but only waste computation. Therefore, a resampling strategy is used to avoid sending such examples into training algorithm. Only examples in which the model in its current status cannot correctly infer the triplet relationship are formed. The resampling strategy is designed such that the overall training objective evaluated based on the sampled examples is the same as it is when all examples are sampled for training.

In some embodiments, during training, single-task network component 114 sets the initial learning rate to 0.05. The learning rate may be reduced, by single-task network component 114, to 0.0005 in the middle of training. Additionally, in various embodiments, single-task network component 114 sets the batch size to 128, momentum to 0.9, weight decay to 0.0005 for each layer, dropout ratio after fc7 and fc8 to 0.5, and the margin α to 0.1.

The distilling component 116 is generally configured to approximate the single-task networks on a common ranking task. To do so, distilling component 116 initially transforms all the single-task networks into a Siamese structure with three branches of sub-network so that a common triplet ranking loss can be applied to all of them. This is necessary because each single-task network has a different objective function and feature dimension and the distilling component 116 cannot fuse the single-task networks into one network with existing knowledge distilling methods. In embodiments, even if a label from one of the networks is wrong, by approximating the ensemble ranking of all the single-task networks enables the correct information to train the ensemble network. In distilling, the predictions are combined from all single models as the training objective. If the prediction from one of the single networks is wrong, but all the others are correct, then the combined prediction is still correct. In this way, some of the labeling errors can be corrected when training the distilling network.

During distilling, distilling network component 116 trains a new Siamese network whose ranking function is optimized to approximate the ensemble ranking of all the single-task networks. Assuming there are n single-task networks whose feature extraction functions are denoted as $f_1, f_2, \ldots, f_n$, the new distilling network is represented below by function g. The training objective for the distilling network is:

$$\min \sum_{(x_A, x_P, x_N)} \left[ \|g(x_A) - g(x_P)\| - \|g(x_A) - g(x_N)\| + \min\left(\alpha, \frac{1}{n}\sum_{i=1}^{n} [\|f_i(x_A) - f_i(x_N)\| - \|f_i(x_A) - f_i(x_P)\|]\right) \right]_+$$

In embodiments, only the parameters of g are updated by distilling component 116 during the optimization. The ensemble of the single-task networks is used by distilling component 116 to adjust the required margin for the distilling network. For a triplet with noisy label, the ensemble network may produce a small margin (even negative) so that it has less effect on the training of the distilling network. For reliable triplets, the distilling component 116 uses a constant margin. The triplet sampling can be carried out similarly as in the single-task network. All the label information (object category, style field, image group) can be used to sample positive and negative images. Actual testing has shown that, compared to existing CNNs trained on ImageNet, embodiments of the present invention have improved the average precision by eighteen percent. In embodiments, the distilling component 116 communicates the distilling network to the test engine 120 which utilizes the distilling network to predict tags to associate with a test image or identify similar images to the test image.

Figure 2:
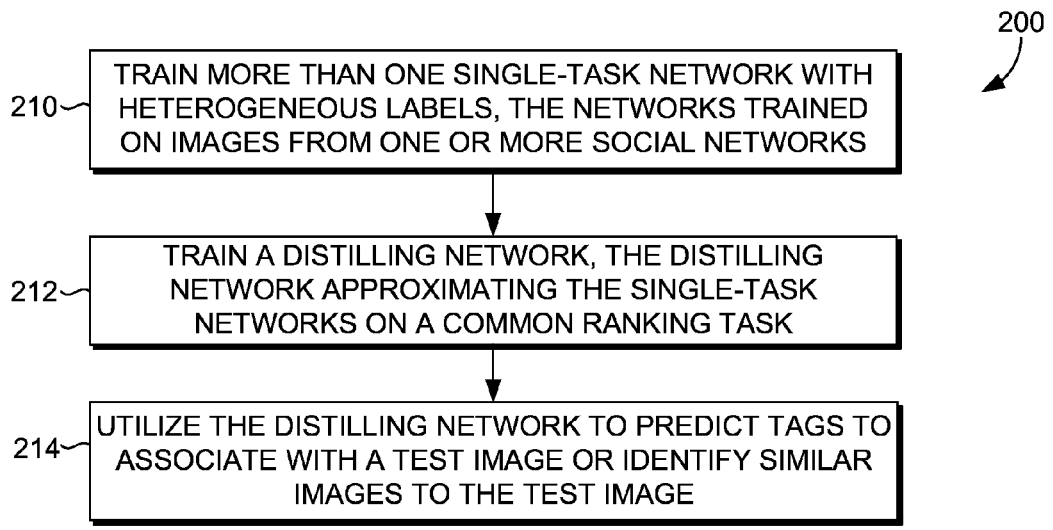
FIG. 2 is a flow diagram showing a method for training a distilling network, in accordance with embodiments of the present invention.

Referring now to FIG. 2, a flow diagram is provided that illustrates a method 200 for training a distilling network, in accordance with embodiments of the present invention. Such a method can be performed, for example, at a training engine, such as training engine 112 of FIG. 1. Each block of the method 200 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be performed using a computing device, such as the computing device 600 of FIG. 6.

As shown at step 210, more than one single-task network is trained with heterogeneous labels. Each of the networks is trained on images from one or more social networks. In some embodiments, each of the single-task networks is trained on the same set of images. In one embodiment, one of the single-task networks is a CNN with softmax cost function. The CNN is trained on object class category.

Figure 4:
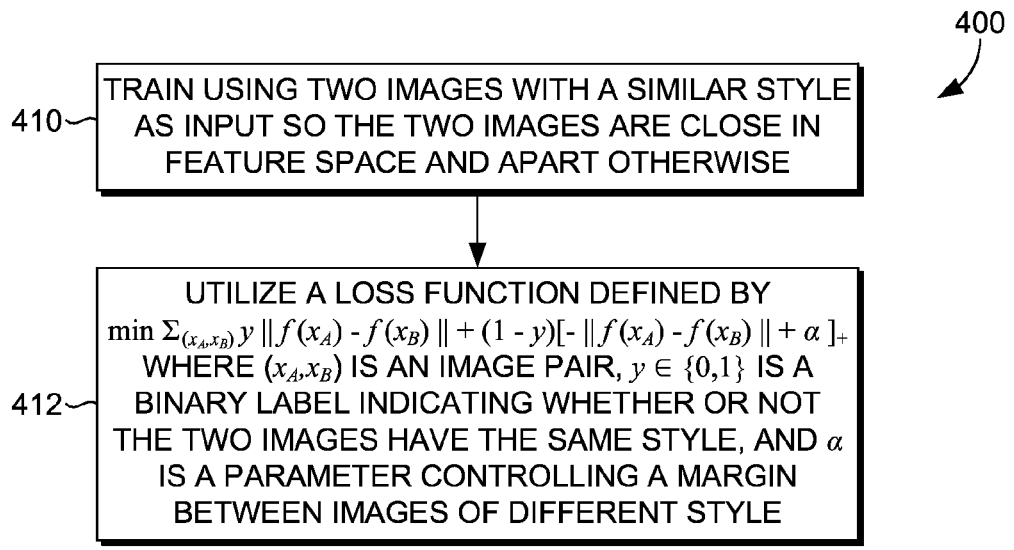
FIG. 4 is a flow diagram showing a method for training a single-task network that can be utilized by a distilling network, in accordance with embodiments of the present invention.

Turning now to FIG. 4, a flow diagram is provided that illustrates a method 400 for training a single-task network that can be utilized by a distilling network, in accordance with embodiments of the present invention. Such a method can be performed, for example, at a training engine, such as training engine 112 of FIG. 1. As can be appreciated, additional or alternative steps may also be included in different embodiments. Initially, as indicated at step 410, one of the single-task networks is trained using two images with a similar style as input so the two images are close in feature space and apart otherwise. At step 412, the training utilizes a loss function defined by $\min \Sigma_{(x_A, x_B)} y \|f(x_A) - f(x_B)\| + (1-y)[-\|f(x_A) - f(x_B)\| + \alpha]_+$, where $(x_A, x_B)$ is an image pair, $y \in \{0,1\}$ is a binary label indicating whether or not the two images have the same style, and $\alpha$ is a parameter controlling a margin between images of different style. In some embodiments, a Siamese network structure is utilized with two or three branches of sub-networks with identical structure and parameters.

Figure 5:
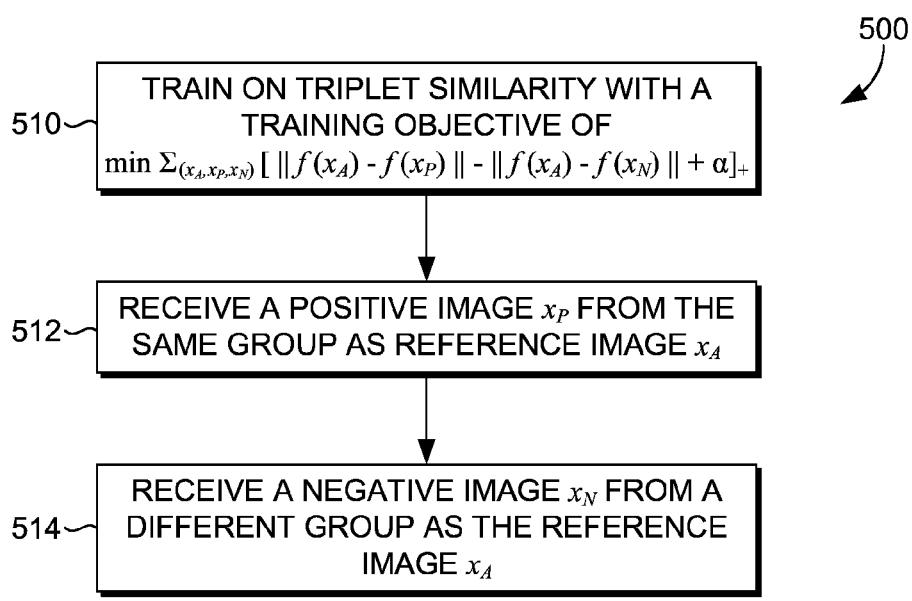
FIG. 5 is a flow diagram showing a method for training a single-task network that can be utilized by a distilling network, in accordance with embodiments of the present invention.

Referring now to FIG. 5, a flow diagram is provided that illustrates a method 500 for training a single-task network that can be utilized by a distilling network, in accordance with embodiments of the present invention. Such a method can be performed, for example, at a training engine, such as training engine 112 of FIG. 1. As can be appreciated, additional or alternative steps may also be included in different embodiments. Initially, as indicated at step 510, one of the single-task networks is trained on triplet similarity with a training objective of $\min \Sigma_{(x_A, x_P, x_N)} [\|f(x_A) - f(x_P)\| - \|f(x_A) - f(x_N)\| + \alpha]_+$. A positive image $X_P$ is received, at step 512, from the same group as reference image $X_A$. At step 514, a negative image $X_N$ is received from a different group as the reference image $X_A$.

In some embodiments, a Siamese network structure is utilized with two or three branches of sub-networks with identical structure and parameters. Triplets may be grouped with the same reference images in a mini-batch which enables them to share computation of the reference image. Negative images may be sampled with probabilities according to an ontological distance to the reference image.

Referring back to FIG. 2, in some embodiments, each of the single-task networks is transformed into a Siamese structure with three branches of sub-networks so that a common triplet ranking loss can be applied to each branch. This enables a distilling network that approximates the single-task networks on a common ranking task to be trained, at step 212. The distilling network may be a new Siamese network whose ranking function is optimized to approximate an ensemble ranking of each of the single-task networks. In embodiments, a training objective for the distilling network, represented by function g, is $$\min \sum_{(x_A, x_P, x_N)} \left[ \|g(x_A) - g(x_P)\| - \|g(x_A) - g(x_N)\| + \min\left(\alpha, \frac{1}{n}\sum_{i=1}^{n} [\|f_i(x_A) - f_i(x_N)\| - \|f_i(x_A) - f_i(x_P)\|]\right) \right]_+,$$

where there are n single-task networks whose feature extraction functions are denoted as $f_1, f_2, \ldots, f_n$. In some embodiments, only the parameters of g are updated in optimization.

In various embodiments, an initial learning rate is set at 0.05 and reduced to 0.0005 in the middle of training, a batch size is set to 128, a momentum is set to 0.9, a weight decay is set to 0.0005 for all layers, a dropout ratio after fc7 and fc8 is set to 0.5, and/or a margin $\alpha$ is set to 0.1. The required margin may be adjusted for the distilling network utilizing the ensemble of single-task networks. At step 214, the distilling network is utilized to predict tags to associate with a test image and/or to identify similar images to a test image.

Figure 3:
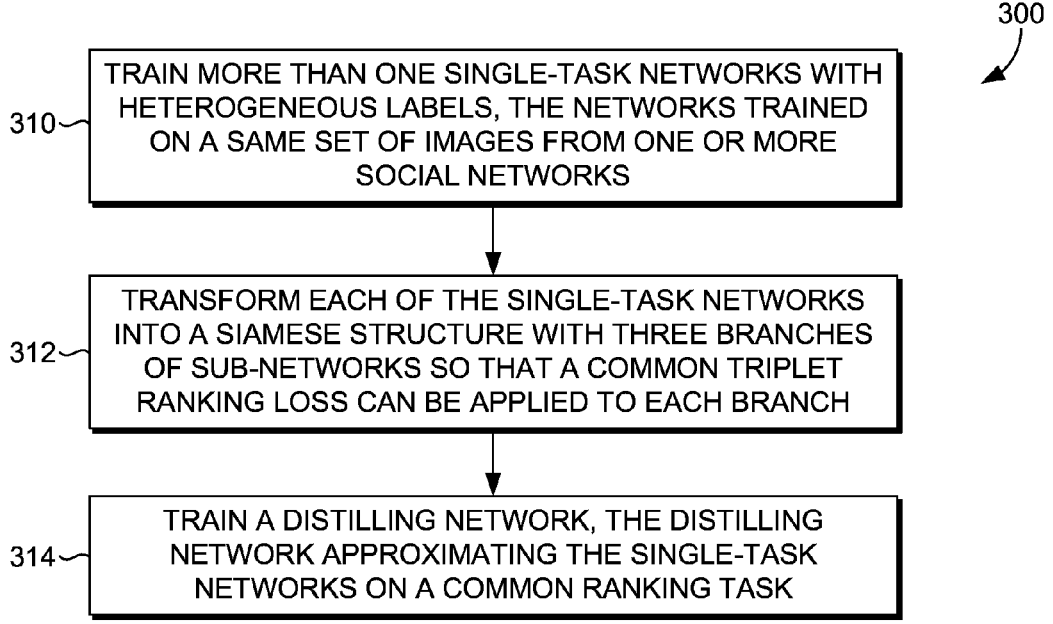
FIG. 3 is a flow diagram showing a method for learning image representation by distilling from multi-task networks, in accordance with embodiments of the present invention.

Turning now to FIG. 3, a flow diagram is provided that illustrates a method 300 for learning image representation by distilling from multi-task networks. Such a method can be performed, for example, at a training engine, such as training engine 112 of FIG. 1. As can be appreciated, additional or alternative steps may also be included in different embodiments. Initially, as indicated at step 310, more than one single-task networks with heterogeneous labels are trained. The networks are trained on a same set of images from one or more social networks.

At step 312, each of the single-task networks is transformed into a Siamese structure with three branches of sub-networks so that a common triplet ranking loss can be applied to each branch. A distilling network is trained, at step 314, to approximate the single-task networks on a common ranking task. The distilling network is utilized, in some embodiments, to predict tags to associate with a test image or identify similar images to the test image.

Having described an overview of embodiments of the present invention, an exemplary computing environment in which some embodiments of the present invention may be implemented is described below in order to provide a general context for various aspects of the present invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 6:
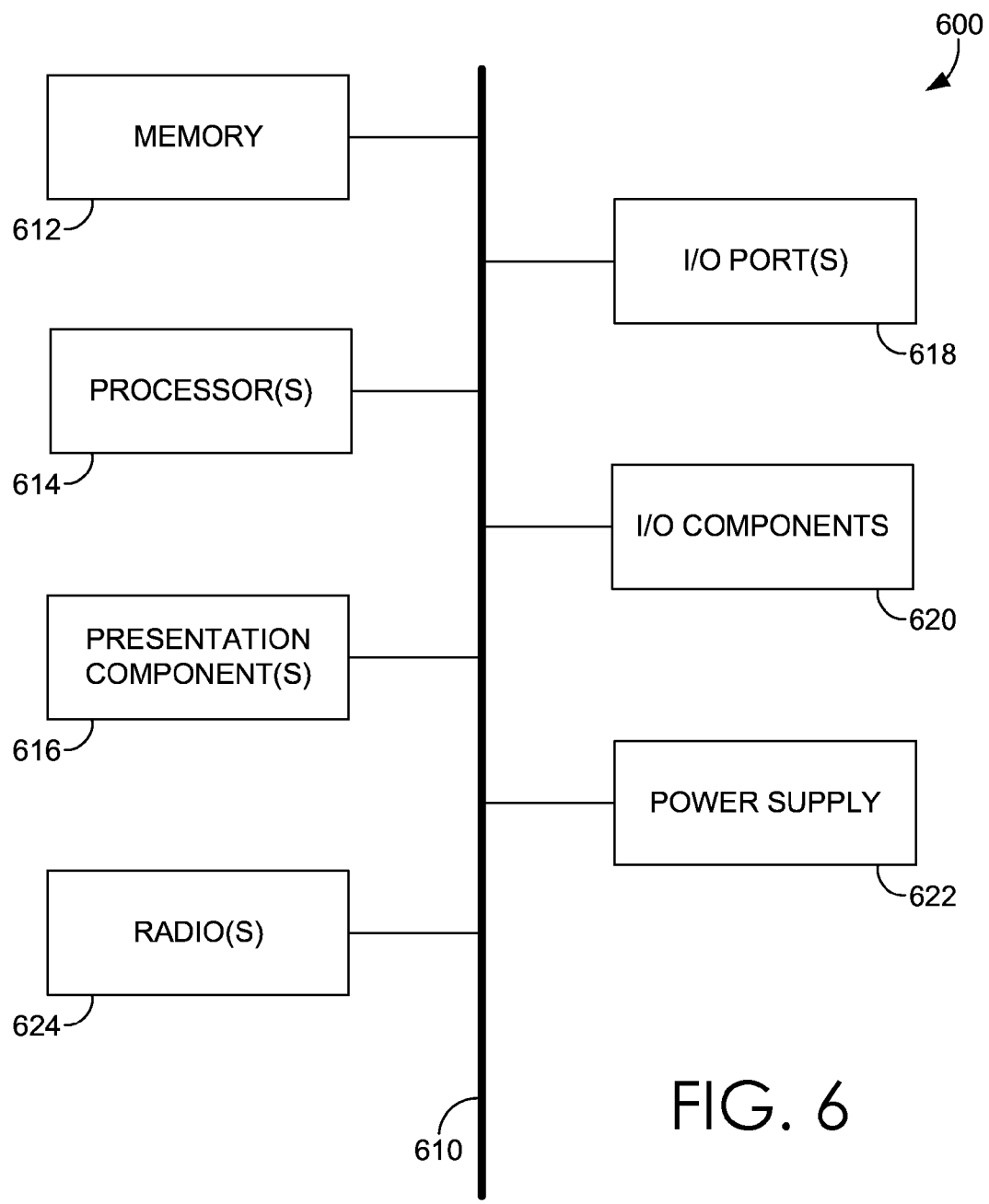
FIG. 6 is a block diagram of an exemplary system in which embodiments of the invention may be employed.

Accordingly, referring generally to FIG. 6, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, learning image representation by distilling from multi-task networks. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform a method for distilling from multi-task networks, the method comprising:
    training more than one single-task network with heterogeneous labels, the networks trained on images from one or more social networks;
    training a distilling network, the distilling network approximating the single-task networks on a common ranking task; and
    utilizing the distilling network to predict tags to associate with a test image or identify similar images to the test image.

2. The one or more computer storage media of claim 1, wherein each of the single-task networks are trained on the same set of images.

3. The one or more computer storage media of claim 1, wherein one of the single-task networks is a convolutional neural network with softmax cost function.

4. The one or more computer storage media of claim 3, wherein the convolutional neural network is trained on object class category.

5. The one or more computer storage media of claim 1, wherein one of the single-task networks is trained using two images with a similar style as input so the two images are close in feature space and apart otherwise, wherein the training utilizes a loss function defined by $\min\Sigma_{(x_A, x_B)} y \|f(x_A) - f(x_B)\| + (1-y)[-\|f(x_A) - f(x_B)\| - \alpha]_+$, where $(x_A, x_B)$ is an image pair, $y \in \{0,1\}$ is a binary label indicating whether or not the two images have the same style, and $\alpha$ is a parameter controlling a margin between images of different style.

6. The one or more computer storage media of claim 5, wherein a Siamese network structure is utilized with two or three branches of sub-networks with identical structure and parameters.

7. The one or more computer storage media of claim 1, wherein one of the single-task networks is trained on triplet similarity with a training objective of $\min\Sigma_{(x_A, x_P, x_N)} [\|f(x_A) - f$ $(x_P)\|-\|f(x_A)-f(x_N)\|+\alpha]_+$, wherein a positive image $X_P$ comes from a same group as a reference image $X_A$, and a negative image $X_N$ comes from a different group.

8. The one or more computer storage media of claim 7, wherein a Siamese network structure is utilized with two or three branches of sub-networks with identical structure and parameters.

9. The one or more computer storage media of claim 1, wherein triplets are grouped with same reference images in a mini-batch and share computation of the reference image.

10. The one or more computer storage media of claim 9, wherein negative images are sampled with probabilities according to an ontological distance to the reference image.

11. The one or more computer storage media of claim 1, further comprising transforming each of the single-task networks into a Siamese structure with three branches of sub-networks so that a common triplet ranking loss can be applied to each branch.

12. The one or more computer storage media of claim 11, wherein the distilling network is a new Siamese network whose ranking function is optimized to approximate an ensemble ranking of each of the single-task networks.

13. The one or more computer storage media of claim 12, wherein a training objective for the distilling network, represented by function g, is $$\min \sum_{(x_A, x_P, x_N)} \left[ \|g(x_A) - g(x_P)\| - \|g(x_A) - g(x_N)\| + \min\left(\alpha, \frac{1}{n}\sum_{i=1}^{n} [\|f_i(x_A) - f_i(x_N)\| - \|f_i(x_A) - f_i(x_P)\|]\right) \right]_+,$$

where there are n single-task networks whose feature extraction functions are denoted as $f_1, f_2, \ldots, f_n$.

14. The one or more computer storage media of claim 13, wherein only the parameters of g are updated in optimization.

15. The one or more computer storage media of claim 14, further comprising adjusting a required margin for the distilling network utilizing the ensemble of single-task networks.

16. A method for learning image representation by distilling from multi-task networks, the method comprising:
training more than one single-task networks with heterogeneous labels, the networks trained on a same set of images from one or more social networks;
transforming each of the single-task networks into a Siamese structure with three branches of sub-networks so that a common triplet ranking loss can be applied to each branch; and
training a distilling network, the distilling network approximating the single-task networks on a common ranking task.

17. The method of claim 16, further comprising utilizing the distilling network to predict tags to associate with a test image.

18. The method of claim 16, further comprising utilizing the distilling network to identify similar images to a test image.

19. The method of claim 16, wherein a training objective for the distilling network, represented by function g, is $$\min \sum_{(x_A, x_P, x_N)} \left[ \|g(x_A) - g(x_P)\| - \|g(x_A) - g(x_N)\| + \min\left(\alpha, \frac{1}{n}\sum_{i=1}^{n} [\|f_i(x_A) - f_i(x_N)\| - \|f_i(x_A) - f_i(x_P)\|]\right) \right]_+,$$

where there are n single-task networks whose feature extraction functions are denoted as $f_1, f_2, \ldots, f_n$.

20. A computerized system comprising one or more processors and a non-transitory computer storage media storing computer-useable instructions that, when used by the one or more processors, cause the one or more processors to:
train more than one single-task networks with heterogeneous labels;
train a distilling network, the distilling network approximating single-task networks on a common ranking task; and
utilize the distilling network to predict tags to associate with a test image or identify similar images to the test image.

\* \* \* \* \*